(12) United States Patent
Shimooka (10) Patent No.: US 7,574,090 B2
(45) Date of Patent: Aug. 11, 2009

(54) SEMICONDUCTOR DEVICE USING BURIED OXIDE LAYER AS OPTICAL WAVE GUIDES

(75) Inventor: Yoshiaki Shimooka, Sagamihara (JP)

(73) Assignee: Toshiba America Electronic Components, Inc., Irvine, CA (US)

( * ) Notice: Subject to any disclaimer, the term of this patent is extended or adjusted under 35 U.S.C. 154(b) by 428 days.

(21) Appl. No.: 11/432,483

(22) Filed: May 12, 2006

(65) Prior Publication Data

US 2007/0262327 A1  Nov. 15, 2007

(51) Int. Cl.
G02B 6/10 (2006.01)

(52) U.S. Cl. ........................ 385/129; 385/131
(58) Field of Classification Search ................... 385/131
See application file for complete search history.

(56) References Cited

U.S. PATENT DOCUMENTS 7,263,256 B2 * 8/2007 Kim et al. ..................... 385/32

FOREIGN PATENT DOCUMENTS

| JP | 2002-246639 | 8/2002 |
|---|---|---|
| JP | 2002-323633 | 11/2002 |
| JP | 2003-8054 | 1/2003 |

* cited by examiner

*Primary Examiner*—Kevin S Wood
(74) *Attorney, Agent, or Firm*—Banner & Witcoff, Ltd.

(57) ABSTRACT

A semiconductor optical wave guide device is described in which a buried oxide layer (BOX) is capable of guiding light. Optical signals may be transmitted from one part of the semiconductor device to another, or with a point external to the semiconductor device, via the wave guide. In one example, an optical wave guide is provided including a core insulating layer encompassed by a clad insulating layer. The semiconductor device may contain an etched hole for guiding light to and from the core insulating layer from a transmitter or to a receiver.

20 Claims, 7 Drawing Sheets

SEMICONDUCTOR DEVICE USING BURIED OXIDE LAYER AS OPTICAL WAVE GUIDES

BACKGROUND

Integrated circuits provide an advantage of allowing interconnection of numerous circuits on a semiconductor substrate. Communication may be accomplished between the circuits or transistors within the integrated circuit in an efficient manner. However, integrated circuits have become increasingly complex with increasing numbers of components housed within a semiconductor device. As more circuits are packed into smaller spaces, multilevel interconnects increase in length and complexity accordingly. The resulting long and complicated multilevel interconnects may suffer from increased or unpredictable signal propagation delay. As the length and complexity of the interconnects become even more problematic with increasing circuits or transistors within the integrated circuit, device speed and performance begins to become impacted.

The use of certain Inter-Layer Dielectric (ILD) materials may provide some benefit in preserving device speed and performance in the face of complex interconnects. For example, the dielectric constant (k) of the ILD materials, which is a measure of the ability of the ILD material to hold charge, has been shown to have an effect on device speed and performance in semiconductor circuits. However, low-k ILD is also difficult and costly to apply, making the use of low-k ILD impractical in many cases.

Therefore, there exists a need to provide a semiconductor device in which signal propagation time is optimized or otherwise reduced and speed and performance of semiconductor devices on an integrated circuit are optimized or otherwise increased.

SUMMARY

According to aspects of the present disclosure, a semiconductor optical wave guide device is provided. The optical wave guide may include, for example, a light-conductive core insulating layer encompassed by a clad insulating layer, disposed on a silicon substrate.

According to further aspects, the semiconductor optical wave guide device includes an Si On Insulator (SOI) layer and interconnect. An etched hole may be provided from a top surface of the device to the core insulating layer for transmitting light to and/or from the core insulating layer. Light transmitted from a transmitter or receiver, for example, may be transmitted to an interface with the core insulating layer via the etched hole.

According to still further aspects, a prism is provided in the etched hole. Light transmitted in the etched hole may contact the prism at a first angle and be refracted into the prism at a second angle. The refracted light in the prism may also contact an interface between the prism and the core insulating layer. The light may further be transmitted in the core insulating layer.

Also, the refraction or reflection of light in the core insulating layer may be based on relative values for the indices of refraction of the core insulating layer, clad insulating layer, prism or etched hole, for example.

DETAILED DESCRIPTION

In one example, a semiconductor device is provided comprising a buried oxide (BOX) layer and a Silicon On Insulator (SOI) substrate. The BOX layer may function as an optical signal wave guide such that transistors and devices housed on a semiconductor substrate may communicate via optical signals. The propagation delay in various circuits and devices of a semiconductor device may be thereby improved and even optimized.

The optical wave guide may guide light transmission along a desired path. The light travels in a core region in the optical wave guide. The core region may be characterized by an index of refraction of light and may be surrounded by cladding material. The clad material may likewise have an index of refraction of light. The index of refraction of the core and the index of refraction of the surrounding clad may be determined so as to substantially or fully trap light within the core as the light travels along the optical wave guide.

Various connections between elements are hereinafter described. It is noted that these connections are illustrated in general and, unless specified otherwise, may be direct or indirect and that this specification is not intended to be limiting in this respect.

Illustrative embodiments will be explained with reference to the drawings as follows.

Figure 1A:
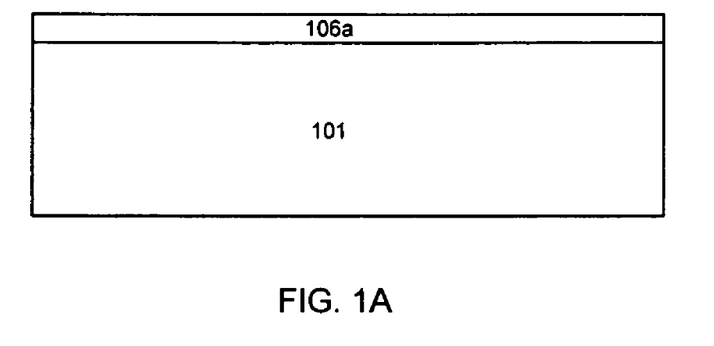
FIGS. 1A-1I are schematic cross sectional views of an illustrative semiconductor device having an optical wave guide, during various steps in an illustrative manufacturing process.

FIGS. 1A-1I are schematic cross sectional views of a semiconductor device having an optical wave guide during various manufacturing stages. As FIG. 1A illustrates, a first clad insulator layer 106a is formed on an Si substrate 101. In one example, the first clad insulator layer 106a may be a doped $SiO_2$ layer. For example, the first clad insulator layer 106a may be a B or F doped $SiO_2$ layer. The amount and/or type of doping of the $SiO_2$ layer may depend on a desired corresponding index of refraction in the optical wave guide. The first clad insulator layer 106a may be formed on the Si substrate 101 in a variety of ways. In one example, the first clad insulator layer 106a may be formed on the Si substrate 101 by a thermal $SiO_2$ formation method as illustrated in FIG. 1A.

Figure 1B:
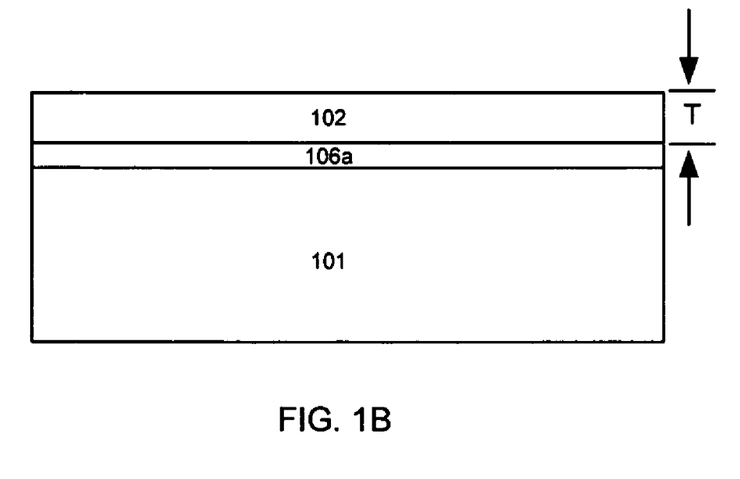

Next, referring to FIG. 1B, a core insulator layer 102 is formed on the first clad insulator layer 106a. In this example, the core insulator layer 102 may be light transmissive and may form a core insulator layer of an optical wave guide. The core insulator layer 102 may be a Ge or P doped $SiO_2$ layer and may be formed on (and in direct physical contact with) the clad insulator layer 106a by a thermal formation method. The core insulator layer 102 may have a thickness T that is greater than a wavelength of an optical signal to be transmitted in the optical wave guide. For example, the thickness T of the core insulator layer 102 may be greater than or equal to the wavelength of blue light, i.e., at least 0.4 µm.

Figure 1C:
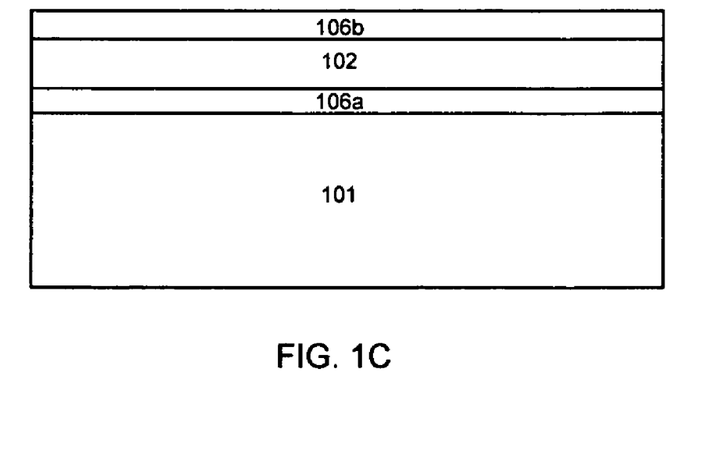

Next, referring to FIG. 1C, a second clad insulator layer 106b is formed on (and in direct physical contact with) the core insulator layer 102. As an example, the second clad insulator layer 106b may be a B or F doped $SiO_2$ layer formed on a Ge or P doped $SiO_2$ core insulator layer 102. The second clad insulator layer 106b may further be formed on the core insulator layer 102 by a thermal SiO2 formation method. The second clad insulator layer 106b may be of the same material and doping as the first clad insulator layer 106a, or it may be different.

Figure 1D:
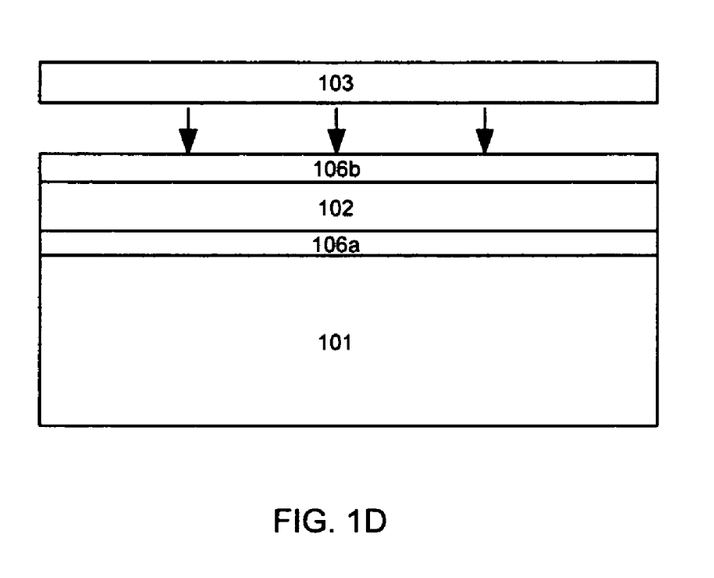
Figure 1E:
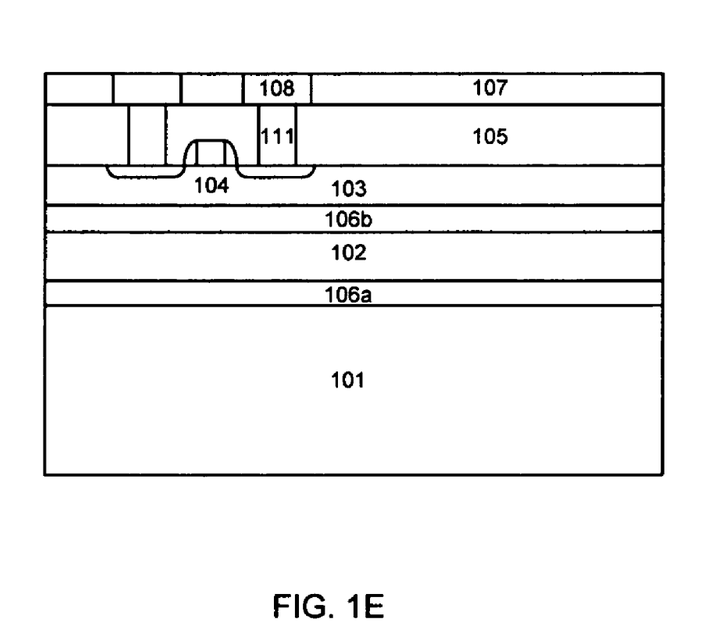
Figure 1F:
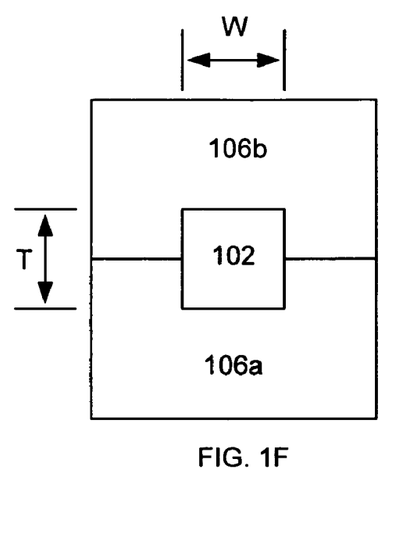

FIGS. 1F-1I illustrate cross sectional views perpendicular to the views of FIG. 1C. In FIG. 1F, the core insulator layer 102 is surrounded by the first clad insulator 106a and the second clad insulator layer 106b. As the example of FIG. 1F illustrates, the core insulator layer 102 may be partially within the first clad insulator layer 106a and partially within the second clad insulator layer 106b. For example, the first clad insulator layer may be formed on the substrate 101 as illustrated in FIG. 1A and may further be etched to form a well. The core insulator layer 102 may be formed on the first clad insulator layer and on the etched well in the first clad insulator layer. The core insulator layer 102 may then be etched such that the core insulator layer 102 is removed from the surface of the first clad insulator layer 106a except for the etched well. The second clad insulator layer 106b may then be formed on the first clad insulator layer 106a and the core insulator layer 102. In one example, the first clad insulator 106a and the second clad insulator 106b may have the same index of refraction which may be different from the index of refraction of the core insulator layer 102.

Figure 1G:
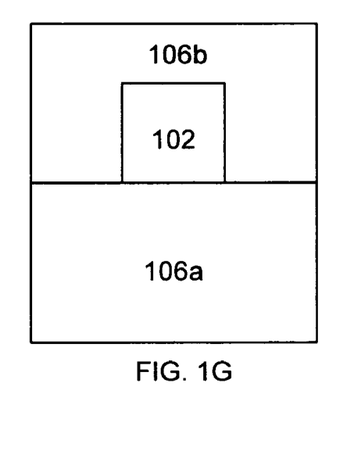

Also illustrated in the example of FIG. 1G, the core insulator layer 102 may have a thickness T that is greater than a wavelength of an optical signal to be transmitted in the optical wave guide. The core insulator layer 102 may also have a width W which may also be greater than a wavelength of an optical signal to be transmitted in the optical wave guide. For example, the thickness T and the width W of the core insulator layer 102 may be greater than or equal to the wavelength of blue light, i.e., at least 0.4 μm. In another example, the thickness T is about equal to the width W of the core insulator layer 102 such that the cross section of the core insulator layer 102 is approximately square shaped.

In another example, the index of refraction of the first clad insulator layer 106a and the second clad insulator 106b are about the same and smaller than the index of refraction of the core insulator layer 102. For example, the first clad insulator layer 106 and the second clad insulator 106b may each have an index of refraction about equal to 1.4-1.5 and the core insulator layer 102 may have an index of refraction of about 1.5-1.6.

In another example as illustrated in FIG. 1G, the first clad insulator layer 106a may be formed on a substrate 101. Next, the core insulator layer 102 may be formed on the first clad insulator layer 106a. Etching may then be performed on the core insulator layer 102 to remove a portion of the core insulator layer 102 to form the core insulator layer 102 as illustrated in the example of FIG. 1G. The second clad insulator layer 106b may then be formed over the first clad insulator layer 106a and the core insulator layer 102.

Figure 1H:
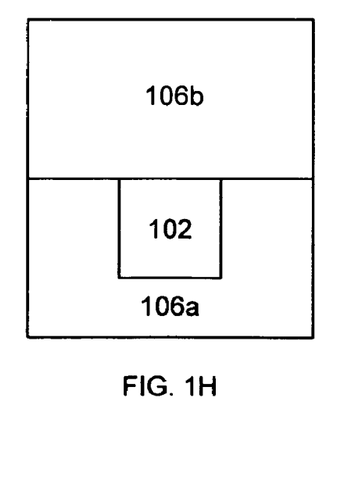

In yet another example as illustrated in FIG. 1H, a first clad layer 106a is formed on a substrate 101. Next, the first clad layer 106a may be etched to form a well in the first clad layer 106a. The core insulator layer 102 may be formed in the well of the first clad layer 106a. The second clad insulator layer 106b may then be formed on the first clad insulator layer 106a and the core insulator layer 102 as illustrated in the example of FIG. 1H. In these examples, the core insulator layer 102 is illustrated as having a thickness T and a square cross sectional shape. However, the cross sectional shape of the core insulator layer may be any shape. For example, the cross sectional shape of the core insulator layer may be approximately square, rectangular, triangular, circular, ovoid, irregularly shaped, etc.

The width of the core insulator layer 102 may be any dimension. For example, the width of the core insulator layer 102 may be approximately equal to the thickness of the core insulator layer 102 (i.e., W may be about equal to T). Alternatively, the width of the core insulator layer 102 may be different from the thickness of the core insulator layer 102 (i.e., less than or greater than). In one example, the width of the core insulator layer 102 is greater than the thickness of the core insulator layer 102. In another example, the width of the core insulator layer 102 is less than the thickness of the core insulator layer 102. In one example illustrated in FIG. 1I, the core insulator layer 102 is formed between a first clad layer 106a and a second clad layer 106b. The width of the core insulator layer 102 in this example is greater than the thickness of the core insulator layer 102. The width of the core insulator layer 102 may also be less than or equal to the thickness of the core insulator layer 102 (not shown).

Figure 1I:
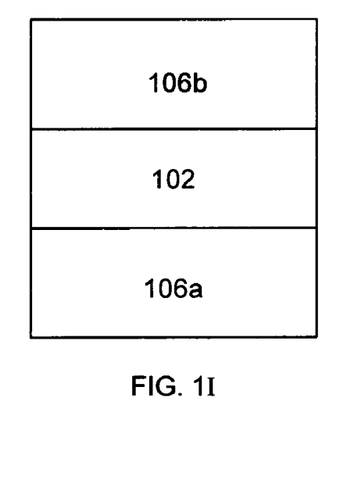

Also, as seen in this example illustrated in FIG. 1I, the width of the core insulator layer 102 is about equal to the width of the first clad layer 106a and the width of the second clad layer 106b. Hence, in this example, the first clad layer 106a and the second clad layer 106b does not surround or encompass the core insulator layer 102.

Next, referring to FIG. 1D, a silicon layer 103 is formed on (e.g., bonded to) the second clad insulator layer 106b of FIG. 1C. The silicon layer 103 may be a Silicon On Insulator (SOI) layer and may further be polished to a desired thickness using a standard SOI manufacturing process. FIG. 1E illustrates a transistor 104, for example, formed on the SOI layer 103. However, any one or more circuit components may be formed on the SOI layer 103, such as resistors, capacitors, and/or transistors. An insulator film 105 (such as SiN) may be deposited on the transistor 104, and vertical tungsten (W) plugs 111 may be formed in the insulator film 105 for electrical connection to the source/drain and gate regions of the transistor 104. Also, an Inter Layer Dielectric (ILD) film 107 may further be deposited on the insulator film 105. Interconnects 108 may be formed to run horizontally in the ILD film 107 in a variety of ways. For example, the interconnects 108 may be formed in the ILD film 107 using a damascene method.

Each of the clad insulator layers 106a, 106b and the core insulator layer 102 may have an associated refractive index for the transmission of light. The values of the refractive index of each of the clad or core insulator layers may determined based on the desired light refraction and transmission. In one example, the refractive index of the core insulator layer 102 may be in the range of about 1.5-1.6. In another example, the refractive index of the clad insulator layer 106a or 106b may be in the range of about 1.4-1.5.

Figure 2:
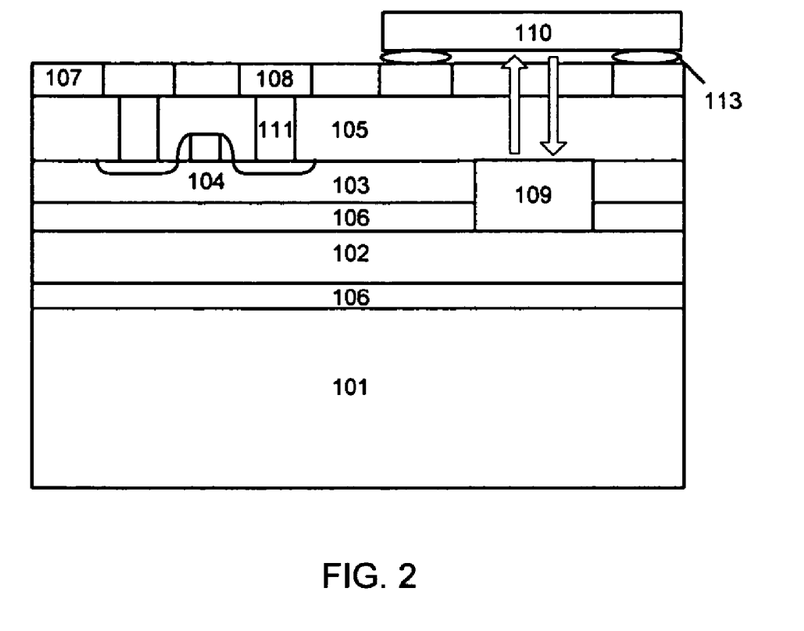
FIG. 2 is a schematic cross sectional view of another illustrative semiconductor device having an optical wave guide.

Referring to FIG. 2, a schematic cross sectional view is shown of another semiconductor device having an optical wave guide. In this example, the B or F doped SiO2 clad insulator layer 106a may be formed on the Si substrate layer 101 by, for example, a thermal SiO2 formation method. The core insulator layer 102 may then be formed, for example, as a Ge or P doped SiO2 layer, on the first clad insulator layer 106a. As in the previous example, light may be transmitted via the core insulator layer 102, wherein the light is reflected off the boundaries between the core insulator layer 102 and the first and second clad insulator layers 106a, 106b. The second clad insulator layer 106b (e.g., SiO2) may be formed on the core insulator layer 102 and the SOI layer 103 may be formed on the second clad insulator layer 106b. The transistor 104 may be formed on the SOI layer 103, and the insulator film layer 105 may be deposited on the transistor 104. W plugs 111 may be formed in the insulator film layer 105. Also, the ILD film 107 may be deposited on the insulator film layer 105. Interconnects, such as Cu interconnects, may be formed in the ILD layer 107.

In addition, as illustrated in FIG. 2, a hole, cavity, or other opening may be etched through the insulator film layer 105 and the SOI insulator layer 103 down to or into the core insulator layer 102, filled with an optically conductive and electrically insulating film 109 material, and planarized. For example, the insulator film 109 material may be planarized by the chemical-mechanical polishing (CMP) method. The interconnects (e.g. Cu interconnects) 108 may be formed such as illustrated in FIG. 2. After formation of the interconnects 108, optical transmitters and/or receivers 110 may be electrically coupled to the interconnects 108 and optically coupled to the insulator film 109 (as indicated by the arrows). Optical transmitters (e.g., laser LEDs) convert electrical input signals to optical output signals, while optical receivers (e.g., photoreceptors) convert optical input signals to electrical output signals. Thus, in this example, an optical signal may be guided through the insulator film 109 to and from the core insulator layer 102, thus allowing signals to be transferred between the core insulator layer 102 and another portion of the circuit via transmitter and/or receiver 110.

Figure 3:
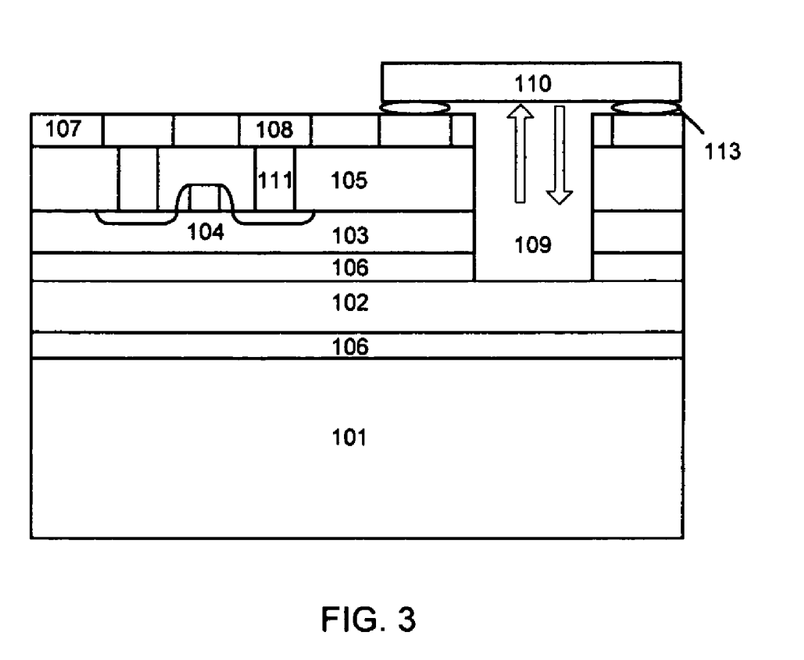
FIG. 3 illustrates yet another example of a semiconductor device having an optical wave guide.

FIG. 3 illustrates another example of an optical wave guide provided in a semiconductor device. In this example, the interconnects (e.g., Cu interconnects) 108 may be formed in the ILD layer 107. The hole, cavity, or other opening 109 may be formed by etching followed by attaching, and thereby electrically connecting, the transmitter and/or receiver 110 to the interconnects 108. The transmitter and/or receiver 110 may be attached to the interconnects via solder 112, for example. Thus, in this example, an optical signal may be transmitted or guided to and/or from the core insulator layer 102 via the air hole 109.

Figure 4:
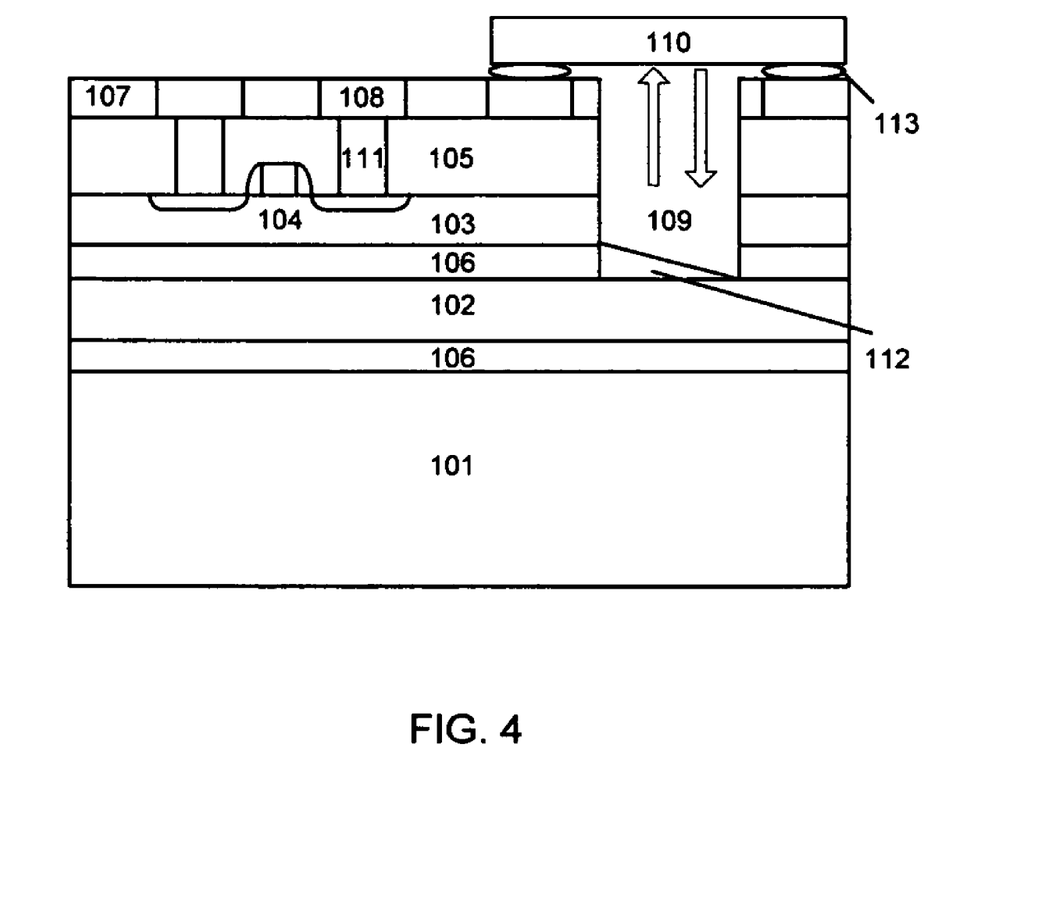
FIG. 4 illustrates a still further example of a semiconductor device having an optical wave guide.

FIG. 4 illustrates another example of an optical wave guide provided in a semiconductor device. In this example, after the interconnects 108 are formed, a hole 109 may be etched. In this example, the hole 109 may be etched through the insulator film layer 105 and the SOI insulator layer 103 to the core insulator layer 102. In addition, as illustrated in the example of FIG. 4, a prism 112 may be formed within the hole 109 to bend the light and further facilitate directing the light between hole 109 and the core insulator layer 102. A transmitter or receiver 110 for transmitting or receiving optical signals may be attached to the interconnects 108. FIG. 4 illustrates the transmitter or receiver 110 attached to the interconnects 108 via solder connectors 113. In any of these examples, the transmitter or receiver 110 may be attached to the interconnects 108 by bump technology, for example. Thus, in the example illustrated in FIG. 4, an optical signal may be transmitted to and from the core insulator layer 102 and guided through the etched hole 109 via a prism 112.

Figure 5:
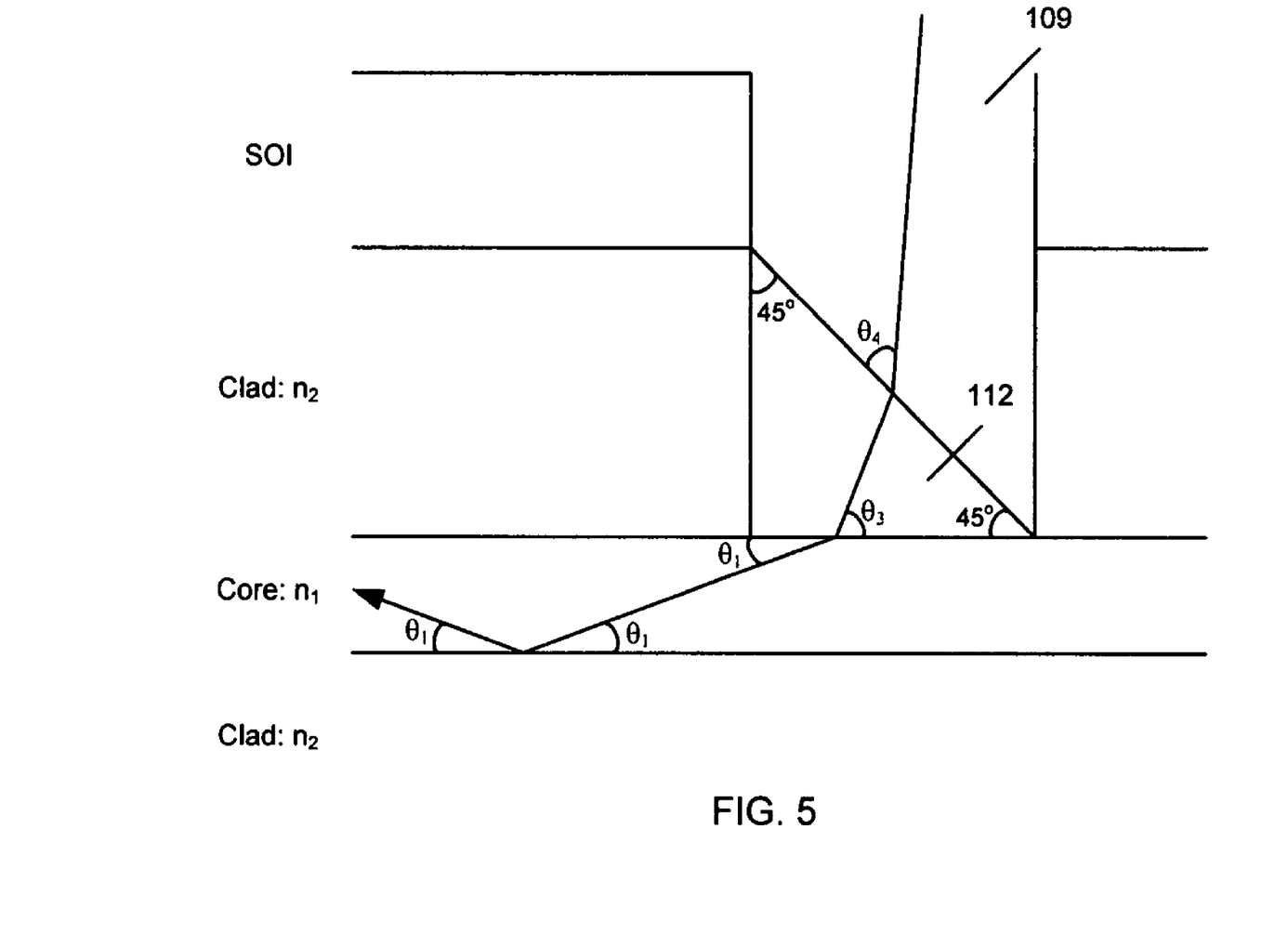
FIG. 5 illustrates an example of the transmission of an optical signal through a waveguide.

FIG. 5 illustrates an example of the transmission of an optical signal through the prism 112. In this example, an optical signal is transmitted from the transmitter or receiver 110 via an etched hole 109 to the core insulator layer 102 in an optical wave guide. As previously described, the prism 112 is formed at the interface between the etched hole 109 and the core insulator layer 102. The optical signal travels via the etched hole 109 and is incident on the surface of the prism 112 at an angle $\theta_4$. The optical signal is refracted through the prism 112 based on the relative values of the refractive index of the prism 112 and the etched hole 109. The resulting optical signal is incident on the core insulator layer 102 at an angle of $\theta_3$ and is further refracted in the core insulator layer 102 at an angle of $\theta_1$ based on the relative values of the refractive index of the prism 112 and the core insulator layer 102. The optical signal may further propagate along the core insulator layer 102 at an angle of q1 at the interface between the clad insulator layer 106a and 106b and the core insulator layer 102 as illustrated, based on the relative values of the refractive index of the core insulator layer 102 and the clad insulator layer 106a/106b.

Figure 6:
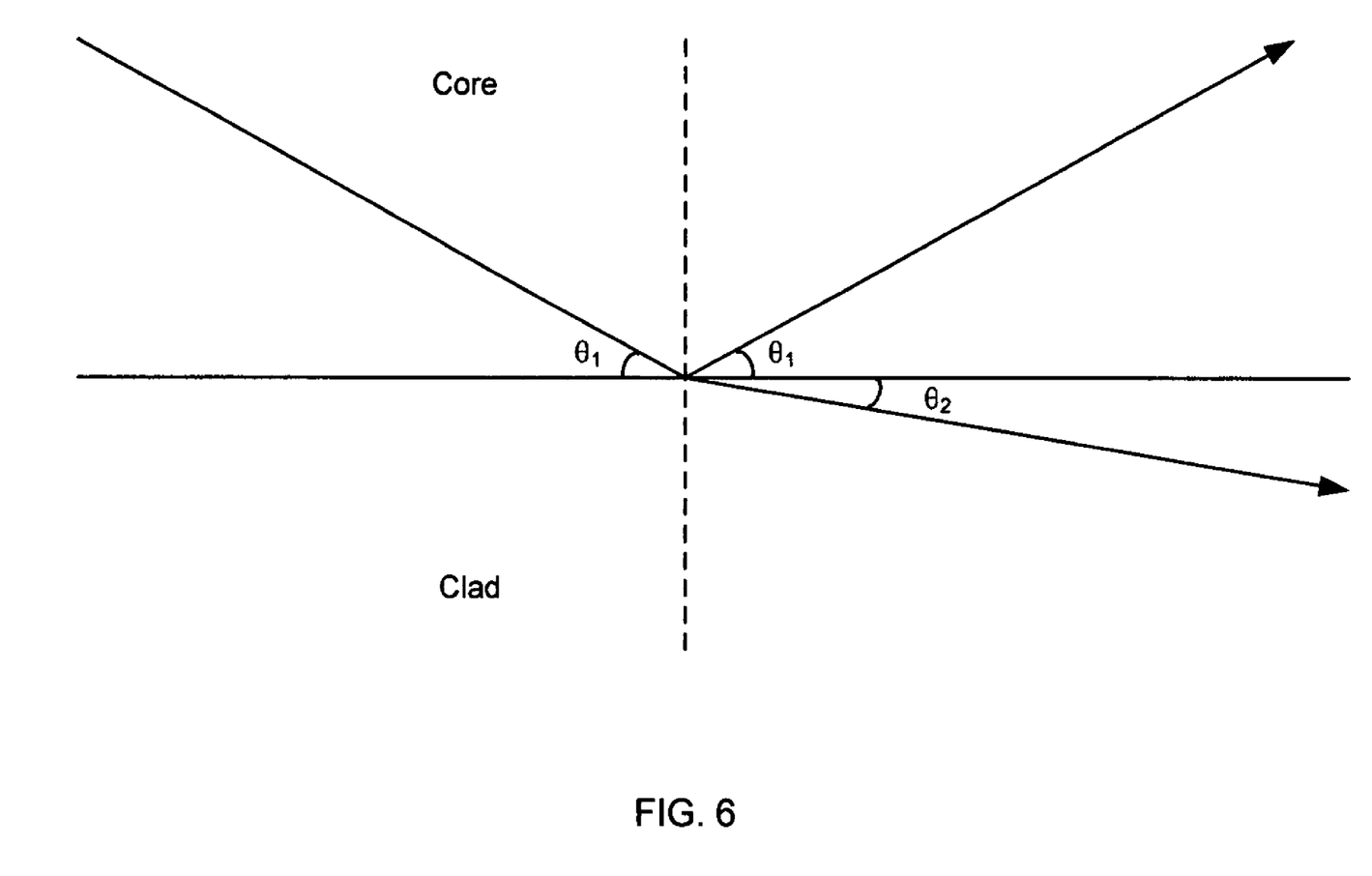
FIG. 6 illustrates an example of an interface between a core insulator layer and a clad insulator layer.

The following illustrates an illustrative relationship of the values of the refractive indices between the core insulator layer 102, the clad insulator layer 106a/106b, the prism 112 and the etched hole 109. In this example, the refractive index of the core insulator layer is about 1.5 to 1.6 and the refractive index of the clad insulator layer is about 1.4 to 1.5. FIG. 6 illustrates an example of an interface between a core insulator layer and a clad insulator layer. In this example, incident light strikes the core/clad interface at an angle of q1. Based on the values of the refractive index of the core and the clad material, the incident light may be reflected back into the core layer at an angle of q1. Alternatively, the incident light may be refracted through the clad layer at an angle of q2. In this example, the light refracted light through the clad layer is not further guided through the optical wave guide.

The relationship of the respective refractive indices and the incident angles may be described as follows:

$$n_1 \cos \theta_1 = n_2 \cos \theta_2$$

where $n_1$ is the refractive index of the core layer, $n_2$ is the refractive index of the clad layer, $\theta_1$ is the angle of reflection of the incident light at the core-clad interface and $\theta_2$ is the angle of refraction of the incident light into the clad layer.

In one example, optical signals propagate through the core layer with complete reflection. In this case, $\cos \theta_2$ is 1 and $$n_1 \cos \theta_1 = n_2 \text{ or}$$

$$\theta_1 = \cos^{-1}(n_2/n_1)$$

In this example, if $n_2$ (the refractive index of the clad layer) ranges from 1.4 to 1.5 and if $n_1$ (the refractive index of the core layer) ranges from 1.5 to 1.6, then $\theta_1$ may range from 20.364°-28.955°.

In another example, the prism may form a 45° angle and the etched hole 109 may contain air with a refractive index $n_4=1$ as illustrated in FIG. 5. In this example:

$$n_1 \cos \theta_1 = n_3 \cos \theta_3 \text{ and}$$

$$\cos \theta_3 = n_1 \cos \theta_1 / n_3$$

where $n_1$ is the refractive index of the core layer, $n_3$ is the refractive index of the prism, $\theta_1$ is the angle of refraction of incident light into the core layer and $\theta_3$ is the angle of the incident light at the prism-core layer interface.

Likewise, in this example, light is incident on the surface of the prism at an angle of $\theta_4$. If the prism is assumed to form a 45° angle as illustrated in the example of FIG. 5, then:

$$n_3 \cos(135-\theta_1) = n_4 \cos \theta_4 = 1 * \cos 45° = 0.7071$$

if, for example, the etched hole is filled with air with a refractive index=$n_4=1$. Thus, in this example, $$n_3 \cos 135° \cos \theta_3 + n_3 \sin 135° \sin \theta_3 = n_4 \cos \theta_4$$

$$n_1 \cos \theta_1 \cos 135° + n_3 \sin 135° \sin \theta_3 = n_4 \cos \theta_4$$

In this example, as set forth above, $\theta_1$ may range from 20.364°-28.955°. If $\theta_3=70°$ and if $\theta_1$ is set to the minimum of 20.364° then:

$$n_3\sin\theta_3 = (n_4\cos\theta_4 - n_1\cos\theta_1\cos135°)/\sin135°$$
$$= (0.7071 - 1.6*\cos(20.364°)\cos135°)/\sin135°$$
$$= (0.7071 - (-1.06066))/\sin135°$$
$$= 2.4999, \text{ and } n_3 = 2.66$$

If $\theta_3=70°$ and if $\theta_1$ is set to the maximum of 28.955° then:

$$n_3\sin\theta_3 = (n_4\cos\theta_4 - n_1\cos\theta_1\cos135°)/\sin135°$$
$$= (0.7071 - 1.6*\cos(28.955°)\cos135°)/\sin135°$$
$$= (0.7071 - (-0.9281))/\sin135°$$
$$= 2.3124, \text{ and } n_3 = 2.46.$$

Thus, in this example, the refractive index of the prism may range between 2.46 to 2.66 and a wide variety of materials may be used for the prism. For example, diamond ($n_3$=2.43) or $Ag_2S_3$ glass ($n_3$=2.58) may be used, to name a few.

Also in this example, the refractive index of each of the materials may be determined relative to the refractive indices of each of the layers. For example, $n_1$ (the refractive index of the core insulator layer) or $n_3$ (the refractive index of the prism) may be greater than $n_2$ (the refractive index of cladding). Also, $n_3$ (the refractive index of the prism) may be greater than $n_4$ (the refractive index of the etched hole. Thus, in this example, $n_3 > n_1 > n_2 > = n_4$.

While specific illustrative examples have been described, those skilled in the art will appreciate that there are numerous variations and permutations of the above described devices and techniques. Thus, the spirit and scope of the invention should be construed broadly, and not necessarily limited to the specific disclosed embodiments, as set forth in the appended claims.

What is claimed is:

1. A semiconductor optical wave guide device, comprising:
    a substrate;
    a first insulating layer disposed on the substrate;
    a second insulating layer disposed on the first insulating layer;
    a third insulating layer physically contacting the first insulating layer and disposed on the second insulating layer and the first insulating layer;
    a silicon layer disposed on the third insulating layer; and
    a transistor formed on the silicon layer,
    wherein the second insulating layer is light transmissive and is of a material different from the first and third insulating layers.

2. The semiconductor optical wave guide device of claim 1, wherein a thickness of the second layer is at least 0.4 micrometers.

3. The semiconductor optical wave guide device of claim 1, wherein the first and third insulating layers together surround at least a portion of the second insulating layer.

4. The semiconductor optical wave guide device of claim 1, wherein the first and third insulating layers are discontinuous from each other and separated by the second insulating layer.

5. The semiconductor optical wave guide device of claim 1, wherein the substrate includes a silicon layer.

6. The semiconductor optical wave guide device of claim 1, wherein the first insulating layer has an index of refraction of about 1.4 to 1.5.

7. The semiconductor optical wave guide device of claim 6, wherein the second insulating layer has an index of refraction of about 1.5 to 1.6.

8. The semiconductor optical wave guide device of claim 1, further comprising a conductive interconnect disposed on the third insulating layer.

9. The semiconductor optical wave guide device of claim 8, further comprising a hole extending completely through the silicon layer and the third insulating layer to the second insulating layer.

10. The semiconductor optical wave guide device of claim 9, further including one of a light transmitter and a light receiver optically coupled to the second insulating layer via the hole.

11. The semiconductor optical wave guide device of claim 10, wherein light that is transmitted through the hole contacts the second insulating layer at a first angle and is refracted into the second insulating layer at a second angle.

12. The semiconductor optical wave guide device of claim 11, wherein the transmitted light contacts an interface between the first insulating layer and the second insulating layer after the transmitted light is refracted into the second insulating layer, the transmitted light contacting the interface between the first insulating layer and the second insulating layer at an angle based on the second angle.

13. The semiconductor optical wave guide device of claim 12, wherein the second angle is in a range of about 20.364 degrees to 28.955 degrees.

14. The semiconductor optical wave guide device of claim 1, wherein the transistor is further formed in the silicon layer.

15. The semiconductor optical wave guide device of claim 1, wherein the transistor comprises source/drain regions embedded in the silicon layer.

16. The semiconductor optical wave guide device of claim 1, further comprising a fourth insulating layer disposed on both the transistor and the silicon layer.

17. A semiconductor optical wave guide device, comprising:
    a substrate;
    a first insulating layer disposed on the substrate;
    a second insulating layer embedded in, physically contacting, and at least partially covered by, the first insulating layer;
    a silicon layer disposed on the first and second insulating layers;
    a conductive layer disposed on the silicon layer; and
    a transistor formed in and on the silicon layer, wherein the conductive layer includes a gate of the transistor,
    wherein the second insulating layer is light transmissive and is of a material different from the first insulating layer.

18. The semiconductor optical wave guide device of claim 17, further including a third insulating layer disposed on the silicon layer and the conductive layer.

19. The semiconductor optical wave guide device of claim 17, wherein a hole extends from a top layer of the semiconductor optical wave guide device down to the second insulating layer such that the second insulating layer is exposed at the hole, and further including one of an optical transmitter and an optical receiver in optical communication with the second insulating layer via the hole.

20. The semiconductor optical wave guide device of claim 17, wherein the transistor comprises source/drain regions embedded in the silicon layer.

* * * * *

UNITED STATES PATENT AND TRADEMARK OFFICE
CERTIFICATE OF CORRECTION

PATENT NO. : 7,574,090 B2 Page 1 of 1
APPLICATION NO. : 11/432483
DATED : August 11, 2009
INVENTOR(S) : Yoshiaki Shimooka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Seventh Day of September, 2010

David J. Kappos
*Director of the United States Patent and Trademark Office*